US007417222B1

(12) United States Patent
Pfeifer et al.

(10) Patent No.: US 7,417,222 B1

(45) Date of Patent: Aug. 26, 2008

(54) CORRELATION ION MOBILITY SPECTROSCOPY

(75) Inventors: Kent B. Pfeifer, Los Lunas, NM (US); Steven B. Rohde, Corrales, NM (US)

(73) Assignee: Sandia Corporation, Albuquerque, NM (US)

( * ) Notice: Subject to any disclaimer, the term of this patent is extended or adjusted under 35 U.S.C. 154(b) by 458 days.

(21) Appl. No.: 11/204,268

(22) Filed: Aug. 15, 2005

(51) Int. Cl.
*B01D 59/44* (2006.01)
*H01J 49/00* (2006.01)

(52) U.S. Cl. ...................................... 250/282; 250/286

(58) Field of Classification Search ....................... None
See application file for complete search history.

(56) References Cited

U.S. PATENT DOCUMENTS

| | | | | |
|---|---|---|---|---|
| 3,639,757 | A * | 2/1972 | Caroll et al. | 250/282 |
| 4,953,407 | A * | 9/1990 | Malaczynski et al. | 73/861.09 |
| 6,797,943 | B2 * | 9/2004 | Losch et al. | 250/282 |
| 7,071,465 | B2 * | 7/2006 | Hill et al. | 250/286 |
| 7,078,680 | B1 * | 7/2006 | Griffin et al. | 250/287 |
| 7,105,808 | B2 * | 9/2006 | Bromberg et al. | 250/287 |
| 7,119,328 | B2 * | 10/2006 | Kaufman et al. | 250/281 |

OTHER PUBLICATIONS

G. A. Eiceman, "Ion Mobility Spectrometry," 2nd Edition, Chapter 4, CRC Press, Boca Raton, FI, (2004).

F. J. Knorr, "Fourier Transform Ion Mobility Spectrometry," Analytical Chemistry, vol. 57, No. 2, Feb. 1985, 402-406.

(Continued)

*Primary Examiner*—David A. Vanore
(74) *Attorney, Agent, or Firm*—Kevin W. Bieg

(57) ABSTRACT

Correlation ion mobility spectrometry (CIMS) uses gating modulation and correlation signal processing to improve IMS instrument performance. Closely spaced ion peaks can be resolved by adding discriminating codes to the gate and matched filtering for the received ion current signal, thereby improving sensitivity and resolution of an ion mobility spectrometer. CIMS can be used to improve the signal-to-noise ratio even for transient chemical samples. CIMS is especially advantageous for small geometry IMS drift tubes that can otherwise have poor resolution due to their small size.

18 Claims, 6 Drawing Sheets

OTHER PUBLICATIONS

R. H. St. Louis, "Apodization Functions in Fourier in Fourier Transform Ion Mobility Spectrometry," Analytical Chemistry, vol. 64, No. 2, Jan. 15, 1992, 171-177.

E. E. Tarver, "External Second Gate, Fourier Transform Ion Mobility Spectrometry: Parametric Optimization for Detection of Weapons of Mass Destruction," Sensors, 2004, 4, 1-13.

M. I. Skolnik, "Introduction to Radar Systems," 2nd Edition, Chapters 10 and 11, McGraw-Hill Book Company, New York, NY 1980.

W. F. Siems, "Measuring the Resolving Power of Ion Mobility Spectrometers," Analytical Chemistry, vol. 66, No. 23, Dec. 1, 1994.

J. Xu, "Space Charge Effects on Resolution in a Miniature Ion Mobility Spectrometer," Analytical Chemistry, vol. 72, No. 23, Dec. 1, 2000, 5787-5791.

K. B. Pfeifer, "Miniaturized Ion Mobility Spectrometer System for Explosives and Contraband Detection," Int. J. Ion Mobility Spectrom, 5(3), 63 (2002).

P. Begley, "Photoemissive ionisation source for ion mobility detectors," J. of Chromatography, 588, (1991) 239-249.

K. L. Linker, "Portable Trace Explosives Detection System: MicroHound™", SAND2004-1067 J (2004).

M. A. Butler, "Two-dimensional patterns for optical alignment," Applied Optics, vol. 30, No. 32, Nov. 10, 1991, 4600-4601.

L. M. Matz, "Evaluation of suspected interferents for TNT detection by ion mobility spectrometry," Talanta 54 (2001) 171-179.

A. J. Marr, "Development and Preliminary Evaluation of a Radio-Frequency Cischarge Ionisation Source for Use in ion Mobility Spectrometry," Int. J. Ion Mobility Spectrometry, 4, 126 (2001).

* cited by examiner

CORRELATION ION MOBILITY SPECTROSCOPY

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention relates to ion mobility spectroscopy and, in particular, to an apparatus and method to improve the signal-to-noise of an ion mobility spectrum using pulse compression techniques.

BACKGROUND OF THE INVENTION

Ion mobility spectroscopy (IMS), sometimes known as plasma chromatography, is a technology that is ideally suited for the detection of very low levels of analyte due to its extreme sensitivity and ability to speciate. In particular, IMS is widely used to detect narcotics, explosives, and chemical warfare agents, since the technique can be tailored to be particularly sensitive to compounds that form negative ions, such as nitrate-laden explosives.

As illustrated schematically in FIG. 1, IMS is based on the atmospheric pressure ionization of a sample vapor and the subsequent separation of the individual ionized components of the sample mixture via electrophoresis as they are accelerated by an external electric field gradient and transit a time-of-flight drift tube against a neutral, counter-flowing gas stream. See G. A. Eiceman and Z. Karpas, *Ion Mobility Spectrometry,* $2^{nd}$ Ed., Chapter 4, CRC Press, Boca Raton, Fl., (2004).

The sample vapor 12 is drawn into an IMS drift tube 20 and ionized in a reaction region 22 (e.g., using a radioactive source, photoionization, or corona discharge ionizer 23), typically through proton transfer or electron capture reactions with reactant ions, to form product ions. The direction of travel of the ions depends on the polarity of the electric field 24. For example, common explosives contain electronegative nitro functional groups. Therefore, the ionization chemistry for explosives tends to form negative ions. Halogenated compounds, such as methylene chloride, can be added to a carrier gas in the reaction region 22 to provide chloride reactant ions (i.e., $Cl^-$). The chloride reactant ions can then transfer charge to the electronegative explosive molecules to form molecular ions.

Normally, a swarm, or pulse, of ions 14 is periodically gated into the drift region 25 of the drift tube 20 by a gating means 26. In the drift region 25, the ions 14 establish a terminal velocity under the influence of the potential gradient of the electric field 24 and are separated according to their characteristic ion mobility against the counter-flowing drift gas 16. The separation begins at the entrance gate 26 and terminates at an ion detector 27 at the end of the drift region 25, where the ion response signal is recorded. For example, the ion detector 27 can be a collecting electrode or Faraday plate that records an ion response current. An aperture grid 28 can be located just ahead of the collecting electrode 27 to capacitively decouple the approaching ion cloud and prevent peak broadening due to premature response.

The response of the IMS drift tube 20 is measured as a function of ion current versus the ion arrival time at the collecting electrode 27 for a measurement cycle. The spectrum of ion arrival times at the collecting electrode 27 indicates the relative ion mobility of each ion through the drift region 25. Compound identification is based on the comparison of the mobility spectrum generated from the sample with the spectrum of a known standard.

The gating means provides a potential capture well that controls the injection of ions into the drift region. IMS drift tubes have normally been operated by opening an electrostatic ion shutter to allow a narrow pulse of ions into the time-of-flight drift region where they move toward the collecting electrode as a single ion swarm to be measured as a transient collected current. The electrostatic ion shutter can be a Bradbury-Nielson or Tyndall type shutter. The Bradbury-Nielson shutter consists of a coplanar array of parallel thin wires wherein alternated wires are connected electrically. An electrical potential is applied or removed between the neighboring wires to block or allow passage of the ion swarm through the shutter. The electric field of the Bradbury-Nielson shutter is perpendicular to the electrical field of the drift tube, thereby blocking passage of the ions into the drift region as the ions are annihilated on the coplanar wires when the electrical potential is applied to the shutter. The shutter is opened by bringing the two sets of coplanar wires to a common potential. The related Tyndall shutter uses two closely spaced planes of electrodes consisting of parallel wires or screens. A voltage is applied or removed between the planes to block or allow passage of the ion swarm.

A major deficiency of this normal operational mode is very inefficient use of available ions. Typically, the ions are annihilated during the intervals that the shutter is closed and allowed to pass as an ion swarm for only a small fraction of the time (e.g., in a 0.2 ms pulse). The ions are allowed to drift for 20-30 ms before being collected and another ion swarm is gated into the drift region. When operated in this normal mode, the duty cycle of on-to-off is generally on the order of 1% or less. Therefore, this technique requires a rather large source of ions to produce a detectable signal during the shutter open interval.

The signal-to-noise ratio (SNR) of this normal mode of operation is typically very small, but can be improved by averaging the data from many measurement cycles. As expected, for "white" noise limited signals, the SNR will increase as the square root of the number of measurements, N, according to:

$$SNR_{ave}=\sqrt{N}SNR_1 \quad [1]$$

where $SNR_1$ is the signal-to-noise ratio for a single measurement cycle and $SNR_{ave}$ is the signal-to-noise ratio for the average measurement. The averaging approach relies on the assumption that the analyte is at a steady-state concentration in the sample vapor and is, therefore, neither varying in concentration or undergoing chemical reactions during the sample interval (i.e., during the duration of the N measurement cycles).

Another approach to IMS operation employs a Fourier transform approach (FTIMS). FTIMS uses both an entrance gate and an exit gate that are simultaneously opened and closed by a frequency sweeping square wave generator to generate a mobility interferogram. The shutter can be operated in a 50% duty cycle at the changing frequencies. The resulting ion current is then sampled and the inverse Fourier transform is performed to convert the interferogram back into the time domain. This process allows for SNR enhancement and increased resolution due to the significant increase in ion efficiency of the tube. However, this technique also requires that the chemical concentration be constant over the length of the frequency scan. See F. J. Knorr et al., *Anal. Chem.* 57(2), 402 (1985); R. H. St. Louis et al., *Anal. Chem.* 64(2), 171 (1992); and E. E. Tarver, *Sensors* 4, 1 (2004).

In many real-world applications of IMS, such as explosives detection, the steady-state condition cannot be relied on to be valid over long sampling intervals. For conditions where the chemical concentration is transient, application of averaging or FTIMS is limited due to finite delays that are inherent in the IMS technique. Indeed, standard averaging approaches can actually reduce the observed signal-to-noise in transient chemical systems rather than enhance it, and in extreme cases can completely mask the analyte signal. For example, an IMS system is typically gated at a rate below 50 Hz for transit times for ions of interest on the order of 20-30 msec. Thus, to achieve an improved SNR according to Eq. [1] it is assumed that the concentration is roughly constant over the sample interval ($t_{sample}$)

$$t_{sample} = \frac{N}{f_{gate}} \quad [2]$$

where $f_{gate}$ is the gating frequency. If $t_{sample}$ is longer than the interval in which the concentration is constant, then averaging begins to diminish the SNR rather than improve it because traces with reduced or missing signal begin to be averaged into the data. Similarly, FTIMS is limited to having the frequency scan completed before the chemical concentration changes.

Therefore, a need remains for an IMS signal-processing method having improved signal-to-noise ratio and that can be used with transient chemical signals.

SUMMARY OF THE INVENTION

The present invention is directed to a correlation ion mobility spectrometer, comprising a reaction region for ionizing a sample vapor to form ions, a drift region in which the ions drift under the influence of an electric field against a counter-flowing drift gas, means for gating a current of the ions into the drift region, means for applying a gating function to the gating means, thereby modulating the ion current, a detector for detecting the ions at the end of the drift region to provide an ion response signal, and means for correlating the ion response signal with the ion current modulation to provide a correlation mobility spectrum.

The modulating means can comprise an analog or a binary modulation, such as a chirped sinusoid or a Barker code pattern. The correlating means can comprise a matched filter. The gating means can comprise a Bradbury-Neilson or Tyndall ion shutter. Alternatively, the gating means can comprise pulsed photoionization or pulsed corona discharge ionization of the sample vapor.

The invention is further directed to a method of correlation ion mobility spectroscopy, comprising providing an ion mobility spectrometer, modulating the gating means with a gating function, thereby modulating the ion current flow into the drift region, and correlating the ion response signal with the ion current modulation to provide a correlation mobility spectrum.

BRIEF DESCRIPTION OF THE DRAWINGS

The accompanying drawings, which are incorporated in and form part of the specification, illustrate the present invention and, together with the description, describe the invention. In the drawings, like elements are referred to by like numbers.

DETAILED DESCRIPTION OF THE INVENTION

Figure 1:
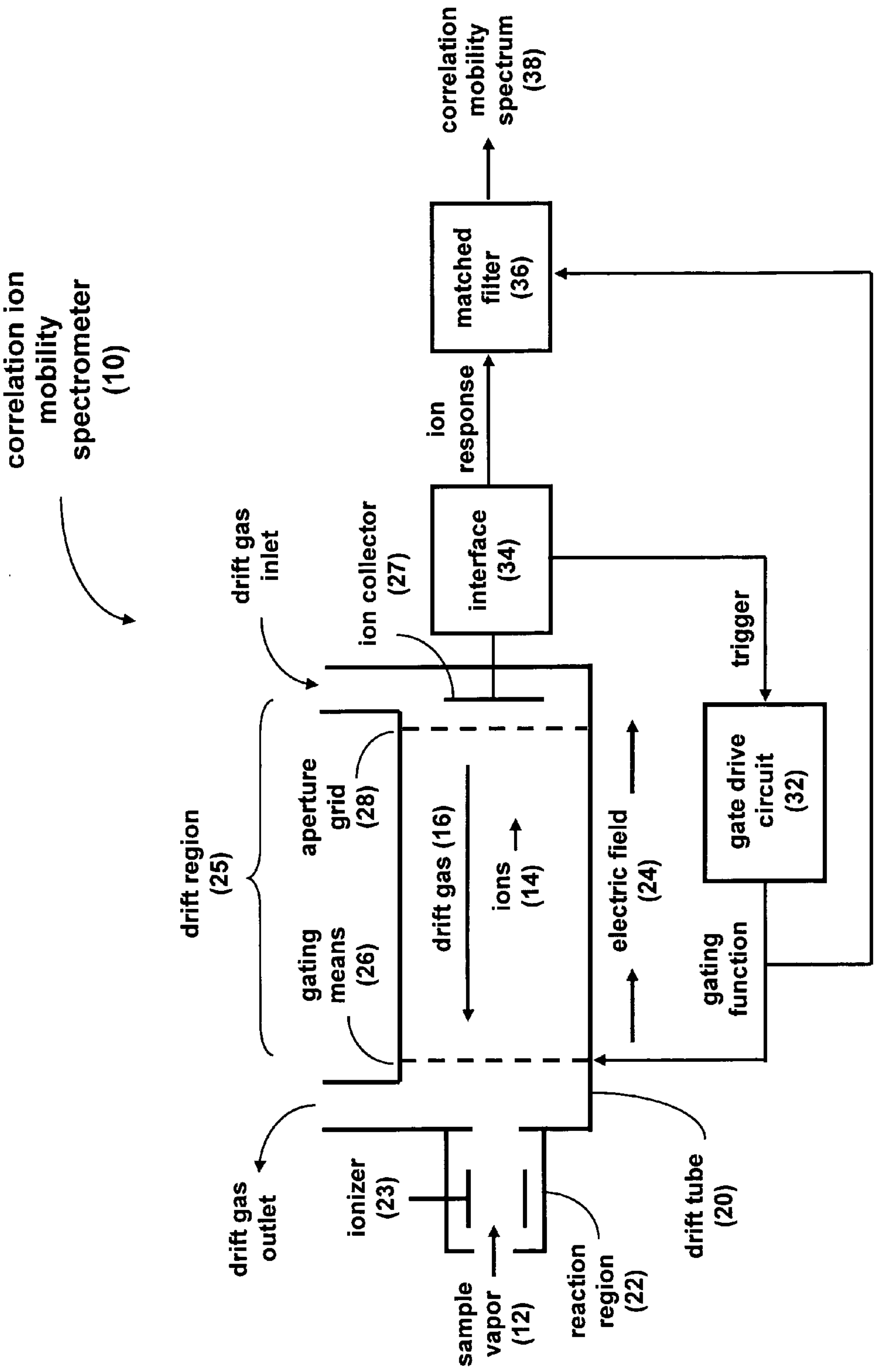
FIG. 1 is a schematic illustration of a correlation ion mobility spectrometer.

When the general IMS signal-processing problem is considered, it can be seen as very similar to RADAR processing. RADAR (RAdio Detection and Ranging) is an electromagnetic system for the detection and location of remote objects (targets). RADAR systems have been used since the late 1930's to give advanced warning of incoming ships, aircraft, and missiles. It operates by transmitting a particular type of radio frequency waveform to a target and detecting the waveform of the echo signal from the target. Once the transmitted pulse is emitted by the RADAR system, a sufficient length of time must elapse to allow the echo signal to return before the next pulse is transmitted.

In general, the returned echo signal has been reflected off the target of interest and multiple other 'targets' that may or may not be of interest. The ability to isolate individual or closely spaced groups of RADAR targets, or the range resolution of the RADAR system, is limited by the temporal length of the RADAR pulse. The time-of-flight of the pulse is used to calculate the range resolution, $R_{res}$, as:

$$R_{res} = ct_{pulse} \quad [3]$$

where c is the speed of light ($3\times10^8$ m/sec) and $t_{pulse}$ is the temporal RADAR pulse length. For example, to resolve two airplanes flying in formation with a 100 m separation, the pulse length must be about 300 nsec. To increase range resolution, systems were designed using shorter pulse lengths. Since simple signal processing used integration of the received echo signal, the power in the transmitted pulse was increased to keep the energy in the shorter integration interval equivalent. To distinguish small, closely spaced targets, the transmit power soon became intolerable and other techniques were developed to use longer pulses to allow longer integration times and lower transmit powers.

One such technique is called pulse compression. See M. I. Skolnik, *Introduction to Radar Systems*, 2nd Ed., Chapters 10 and 11, McGraw-Hill Book Company, New York, N.Y. (1980), which is incorporated herein by reference. Pulse compression allows a RADAR system to utilize a long, low power pulse to achieve a large radiated energy, but simultaneously to obtain the range resolution of a short, high power pulse. Pulse compression accomplishes this by using frequency or phase modulation of the pulse to widen the signal bandwidth. The received signal is processed in a matched filter that compresses the long pulse to a duration that is proportional to the inverse of the modulated pulse bandwidth. The matched filter has a frequency-response function that maximizes the peak signal-to-noise power ratio at the detector, optimizing the detection of a signal in the presence of noise. The output of a matched filter receiver is the cross correlation between the received signal waveform and a replica of the transmitted signal waveform, except for the transit time delay. Therefore, the impulse response of the matched filter is a mirror image, in time, of the input signal.

IMS does not have the 'power problem' of RADAR. However, IMS can benefit from similar pulse compression techniques to overcome the fundamental limit on the number of ions captured in the potential well of an ion shutter and the spreading phenomenon of the ion swarm due to diffusion and electrostatic repulsion in the drift region. The correlation IMS (CIMS) method of the present invention modulates the ion current that is gated into the drift region and correlates the measured ion response signal with the gated ion current modulation to provide a correlation mobility spectrum.

CIMS improves the SNR using pulse compression techniques similar to RADAR. As with the matched filter of pulse compression RADAR, the peak-signal-to-mean-noise ratio ($SNR_{peak}$) of CIMS is:

$$SNR_{peak} \leq \frac{2E_{signal}}{\overline{P}_{noise}} \quad [4]$$

where $E_{signal}$ is the total signal energy, and $\overline{P}_{noise}$ is the noise power per hertz of bandwidth. By adding more signal energy into a single IMS measurement cycle, the peak SNR can be improved commensurately in a single trace interval, albeit at the expense of more back end processing (i.e., matched filtering).

Figure 2:
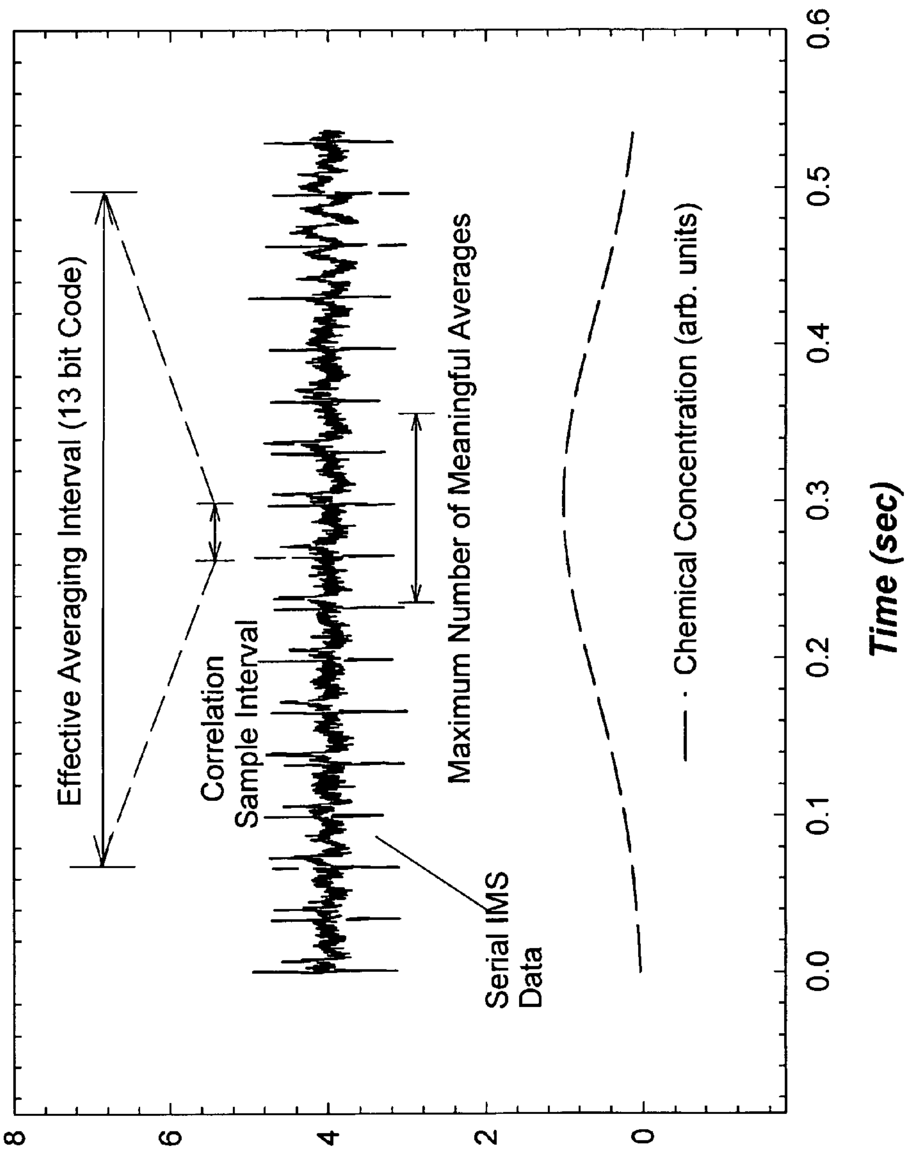
FIG. 2 is a conceptual diagram of the IMS sampling rate compared to the concentration in a transient chemical measurement system.

This SNR improvement is illustrated in FIG. 2, which shows a time plot of a series of IMS measurement cycles plotted along with a conceptual, time-varying chemical concentration. The serial IMS data shows 17 measurement cycles, each cycle having an associated trigger transient and an ion response current. These data were recorded over a 0.55 sec. total sample interval. The chemical concentration signal is depicted by the dashed line. During this total sample interval, the concentration changes significantly. Because of the concentration transient, the maximum number of signal averages, N, that are meaningful is limited to about four in this example. Averaging more than these four measurement cycles will only reduce the $SNR_{ave}$ calculated using Eq. [1], effectively limiting the benefit of the averaging technique. However, the CIMS method of the present invention enables significantly more signal energy to be sampled, resulting in an improved $SNR_{peak}$, according to Eq. [4]. For example, CIMS with a 13-bit Barker code effectively averages the information content of 13 measurement cycles into one correlation sample interval, as illustrated. Thus, greater signal fidelity is obtained in a much reduced time interval.

In general, the IMS problem can be viewed as similar to the RADAR problem in that there is a gated transmitted pulse and at some time later there is a received signal response. However, IMS has the additional complication of time dispersive transport of matter in the form of ions rather than non-dispersive transport of photons as in a RADAR system. As described previously, normal IMS gating is implemented as a short opening of an electrically actuated ion shutter. The ions are then allowed to drift under the influence of an electric field in the drift region toward a collecting electrode. There are several things that influence the mobility and hence the time of arrival of the ions at the collecting electrode, including the mass, molecular shape, collision-cross section, etc. See G. A. Eiceman and Z. Karpas, Chapter 2. However, the width of the detected ion response signal is a function of three distinct phenomenon that are time dependent, but not periodic. Namely these are the initial width of the ion swarm (as in the RADAR analogy), diffusion (dependent on gas temperature and transit time), and electrostatic space charge effects. See W. F. Siems et al., *Anal. Chem.* 66(23), 4195 (1994); J. Xu et al., *Anal. Chem.* 72(23), 5787 (2000); and K. B. Pfeifer and R. C. Sanchez, *Int. J. Ion Mobility Spectrom.* 5(3), 63 (2002). The ion swarm spreading in IMS systems has no analog in RADAR systems as there is no diffusion or electrostatic space charge effects on a photon pulse and its width is essentially unchanged by its propagation from the transmitter to the target and back.

For individual ion species and a given set of electrical and environmental conditions, the ion swarm drift time remains constant, while the distribution of the ions in the swarm is spread thru varied phenomenon. Therefore, pulse spreading is a composite effect that is a function of drift time ($t_{drift}$), but is not periodic. Pulse spreading can be described by a drift tube transfer function, h(t). The ion response signal, i(t), of the gating function, g(t), convolved with the drift tube transfer function is:

$$i(t) = \int_0^t g(\tau)h(t-\tau-t_{drift})\,d\tau \quad [5]$$

The gating function can be represented as a complex Fourier series as follows:

$$g(t) = \frac{1}{2}\sum_{n=-\infty}^{\infty} A_n e^{j\omega_n t} \quad [6]$$

where $A_n$ and $\omega_n$ are the weighting constants and frequency components, respectively. Since the IMS drift tube will act as a causal, time invariant system, the response function (Eq. [5]) can likewise be represented as a complex Fourier series:

$$i(t) = \frac{1}{2}\sum_{m=-\infty}^{\infty} B_m(t_{drift})e^{j\omega_m(t+\tau-t_{drift})} \quad [7]$$

where the weighting constants ($B_m$) are a function of the drift time of the ion in the drift region. Thus, if Eq. [6] is correlated with Eq. [7], the following result is obtained:

$$C(t_{drift}) = \frac{1}{4}\int_{-\infty}^{\infty}\sum_{n=-\infty}^{\infty} A_n e^{j\omega_n\tau} \sum_{m=-\infty}^{\infty} B_m(t_{drift})e^{j\omega_m(t+\tau-t_{drift})}d\tau = \frac{1}{4}\sum_{k=-\infty}^{\infty} A_k B_k(t_{drift})\int_{-\infty}^{\infty} e^{j\omega_k(t+2\tau-t_{drift})}d\tau \quad [8]$$

Therefore, only the diagonal terms (i.e., terms with $\omega_n=\omega_m$) contribute to the correlation integral. Collecting terms, the integral is recognized as the time shifted Fourier transform of a Dirac delta function as follows:

$$\int_{-\infty}^{\infty} e^{j\omega_k(t-t_{drift}+\tau)} e^{j\omega_k \tau} d\tau = \Im\left\{e^{j\omega_k(t-t_{drift}+\tau)}\right\} = 2\pi e^{j\omega_k(t-t_{drift})}\delta(\omega-\omega_k) \quad [9]$$

Thus, the summation yields the correlation function, where B' is a new constant that includes the constant phase shift due to the drift time of the molecule:

$$C(t_{drift}) = \sum_{k=0}^{\infty} A_k B_k'(t_{drift})\delta(\omega-\omega_k) \quad [10]$$

The correlation is a sum of the contributions from the product of the weighting functions of the Fourier series and the Dirac delta function. This suggests correlation of each individual frequency component of the gating function and the response function. Thus, Eq. [10] demonstrates that even with temporal dispersion of the ion swarm due to diffusion, space charge effects, and initial pulse width, the ion swarm retains the frequency information imparted by the gating function and the measured ion signal can, therefore, be correlated with the gating function to improve the resolution and the SNR of the IMS system.

This solution implies that any binary or analog modulated gating function that can be represented as a Fourier series can be used to improve the performance of an ion mobility spectrometer. Therefore, the gating modulation can comprise a series of discrete ion pulses, or an analog waveform modulation of a long pulse or even a continuous ion current, so long as the modulation pattern does not repeat within a measurement cycle that is longer than the drift time of the longest of any ion species in the sample. However, RADAR theory suggests that there are two important modulation functions that may provide higher SNR enhancement than others, namely Barker codes and chirped sinusoids. A Barker code is a binary coding pattern of finite length that has an autocorrelation with equal and low sidelobes. Alternatively, a chirped sinusoid comprises a frequency sweep that is longer than the maximum ion drift time. See Skolnik, Chapter 11.

In general, an ion response signal can be correlated against any basis function that is referenced to the same gating function that is used to generate the ion response signal. For example, a modulated product ion response signal can be correlated against a reactant ion response that was previously obtained using the same gating function modulation. Without a sample vapor being present in the reaction region, the reactant ion is gated into the drift region using the gating function, and the reactant ion response is recorded. In a subsequent experiment, the sample vapor is introduced into the reaction region, the sample vapor reacts with the reactant ions to form product ions, the ions are gated into the drift region using the gating function, and a product ion response signal is recorded. The product ion response signal, $i_{signal}(t)$, can then be correlated against the reactant ion response (that is referred to as the basis function, $i_{basis}(t)$) using a matched filter. Thus, the correlation of the product ion response signal with the basis function is the following:

$$C(t_{drift}) = \int_{-\infty}^{\infty} i_{basis}(\tau) i_{signal}(t+\tau-t_{drift})d\tau \approx \sum_{i=1}^{n} i_{basis}(t_0) i_{signal}(t_0+t_i-t_{drift}) \quad [11]$$

CIMS Experiments Using a Portable Trace Explosives Detector

To investigate CIMS experimentally, the gate of a correlation ion mobility spectrometer 10, as shown in FIG. 1, was modulated using a Barker code pattern and matched filtering was performed on the ion current data that was collected for the modulated ion injections. A gate drive circuit 32 provides a gating function to the gating means 26, thereby modulating the ion current 14 that is gated into the drift region 25. For example, the gate drive circuit 32 can dynamically control the electrical potential difference between the wires of an ion shutter, and thereby modulate the gating of the ion current 14 into the drift region 25. Although the gating function is conveniently applied electronically to an ion shutter, the ion current modulation can be applied via electrical, mechanical, thermal, magnetic, chemical, or acoustic excitation means. For example, the gating means can comprise pulsed photoionization or pulsed corona discharge ionization of the ions and the ionization rate can be modulated. See G. A. Eiceman and Z. Karpas, Chapter 4.3; A. J. Marr et al., *Int. J. Ion Mobility Spectrom.* 4, 126 (2001); and P. Begley et al., *J. Chromatogr.* 588, 239 (1991), which are incorporated herein by reference. An interface 34 can be used to provide a trigger to the gate drive circuit 32 to begin a new measurement cycle and record the ion response from each cycle. The measured ion response signal is correlated with the gating function (or other suitable basis function referenced to the gating function) using a matched filter 36 to provide a correlation mobility spectrum 38.

Laboratory data was collected using sampling and detection equipment from an IMS-based portable trace explosives detector. See K. L. Linker et al., *Portable Trace Explosives Detection System: MicroHound*, SAND2004-1067J (2004). This detector has a miniature ion mobility spectrometer, comprising a stacked, 37 mm long drift tube, and a large scale preconcentration system that employs a vacuum motor and a thin stainless steel felt to "inhale" a sample of explosives. See K. B. Pfeifer and R. C. Sanchez. Explosives have very low vapor pressures ($10^{-6}$-$10^{-9}$ Torr) and are therefore very difficult to detect in the vapor phase. In the preconcentrator, large volumes of air with solid phase explosives particles are drawn through a stainless-steel felt and the explosive particles are captured by the filter. The filter is then heated to desorb the preconcentrated explosive as a concentrated plug into the inlet of the ion mobility spectrometer.

A series of sample injections were made and continuous data was collected using a digital audio tape recorder (DAT). The DAT was interfaced by a direct connection to a built-in analog interface for laboratory evaluation of system performance. The interface included the raw detector output as well as the gate trigger. A gate drive circuit was constructed, based on a programmable integrated controller, to generate a Barker pattern, and was inserted in series between the interface and the spectrometer gate. This gate drive circuit received the gate trigger from the interface and in-turn provided a modulation pattern that was applied to the gate with very small delay. The explosive detector was actuated to perform a normal analysis and the entire process was recorded. 182 gate triggers were sent by the gate drive circuit for the configuration selected for each data collection. Data collected from the experiments was transferred to a personal computer using audio data collection with high resolution audio capture hardware. Software tools were then used to trim individual experimental runs from the continuous data record. Processing to perform the matched filtering was then performed using MathCAD® programs.

See Mathsoft Engineering & Education, Inc., 101 Main Street, Cambridge, Mass. 02142.

In RADAR phase-coded pulse compression, a long pulse is divided into subpulses of equal time duration. The phase of each subpulse is chosen to be either 0 or $\pi$ radians. Barker patterns are normally represented by +1 and −1 for RADAR systems where a $\pi$-phase shift is introduced into the transmitted signal for a binary one and zero phase shift represents a −1. There is no adequate means to reproduce the −1 signal in IMS; rather, the −1 signal is represented as a binary zero. However, it has been shown that, mathematically, this represents a constant offset in the correlation and does not alter the validity of the correlation result. See M. A. Butler et al., *Applied Optics* 30(32), 4600 (1991).

Figure 3:
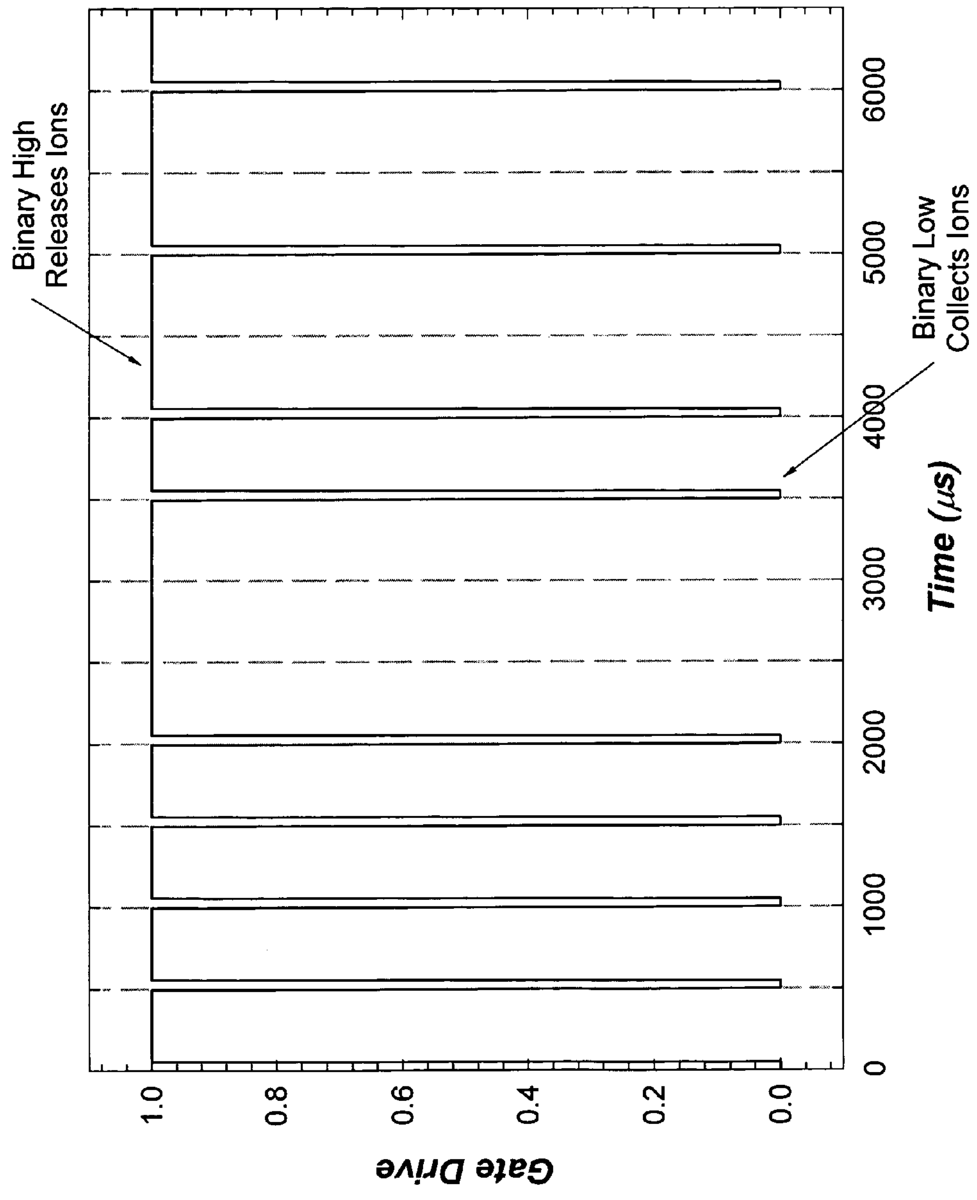
FIG. 3 shows the gating function used to modulate the gated ion current with a 13-bit Barker pattern.

Therefore, the IMS data was obtained using a 13-bit Barker pattern to modulate the gate current, as shown in FIG. 3. The gate was actuated using the active-low control signal shown where a 25 μsec long gate pulse releases a swarm of ions into the drift portion of the IMS tube to represent a Barker code value of binary 1. The swarm is released into a time bin of 500 μsec length. No swarm is released during a time bin represented by a binary zero.

Figure 4:
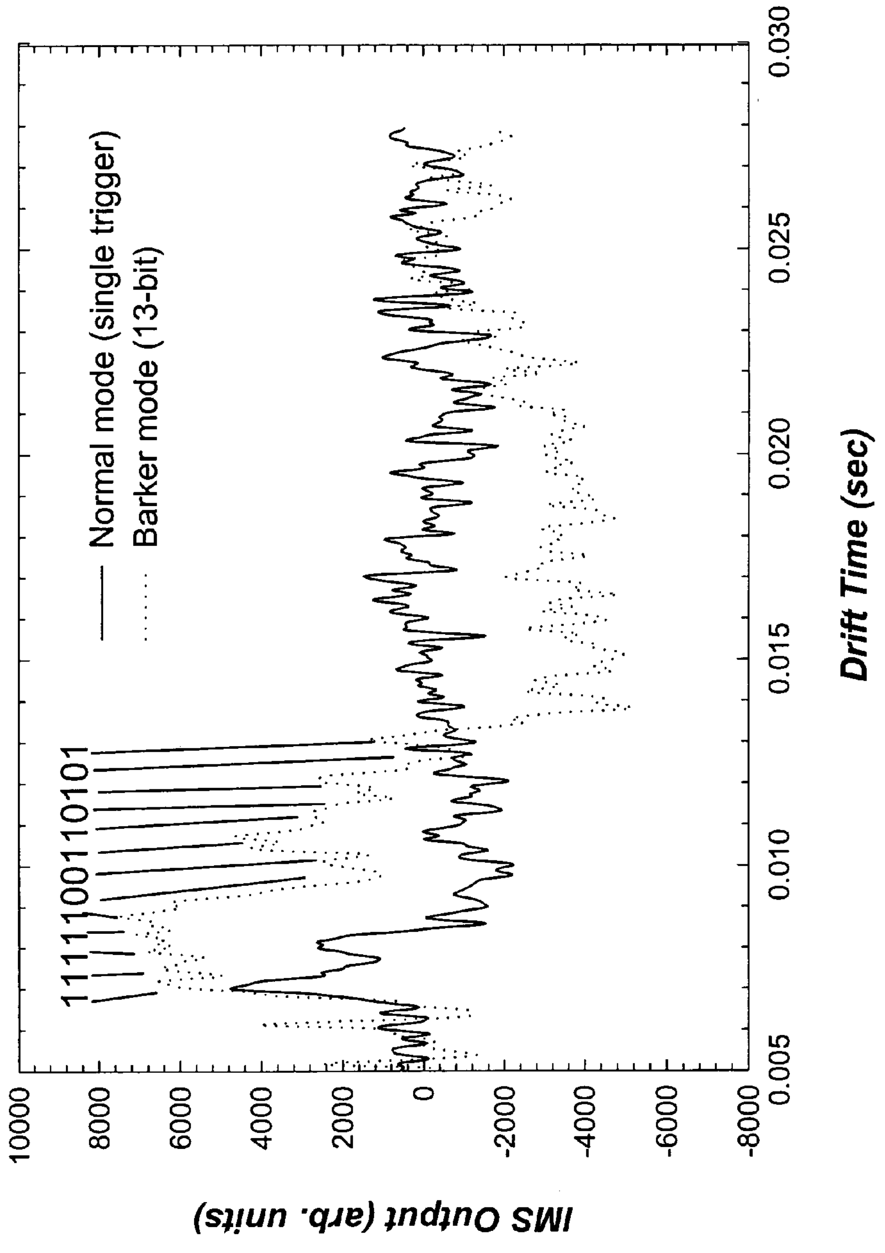
FIG. 4 shows a plot of single trace (no averaging) for a reactant ion response generated using a normal mode gate pulse (solid line) and using the modulated 13-bit Barker pattern gating function (dotted line).

In FIG. 4 is shown a plot of the ion response current from a reactant ion injection ($Cl^-$), triggered using a normal mode (single trigger, solid line) and a 13-bit Barker coded pattern (dotted line). The $Cl^-$ response was measured at 100° C. where it typically has a double peak, as observed in the normal mode plot (i.e., at drift times of about 7 msec and 8 msec). The Barker mode response is very wide and appears very noisy compared to the normal mode response. The Barker mode response is actually the sum of the overlapping Gaussian ion swarms from the series of gate pulses shown in FIG. 3. The measured SNR for the normal mode response is about 1.8 and the SNR for the maximum signal of the Barker mode response is 2.7. The Barker mode response also appears distorted and its maximum is not readily discernable.

Figure 5:
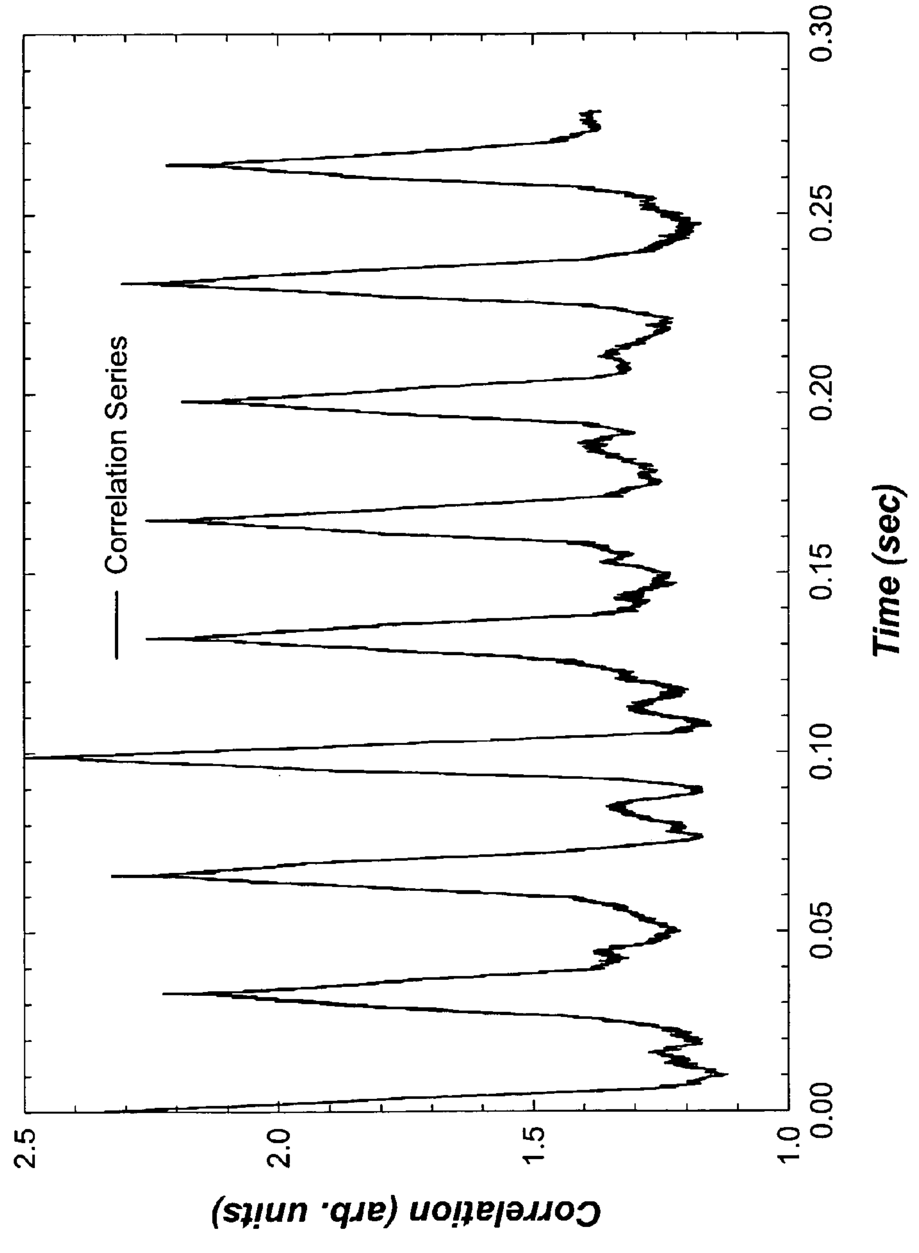
FIG. 5 shows a plot of a series of correlation integrals, obtained by correlating a series of Barker-generated reactant ion responses against a 13-bit Barker pattern gating function.

In FIG. 5 is shown a plot of a series of correlation integrals, obtained by correlating a series of Barker mode responses of the type shown in FIG. 4 against a 13-bit Barker pulse sequence of the form shown in FIG. 3. Each correlation integral peak represents a single, deconvolved Barker-generated response, separated by 30 msec. Each correlation integral peak had a SNR of about 30, or a factor of 16 over the SNR of the normal mode response.

Figure 6:
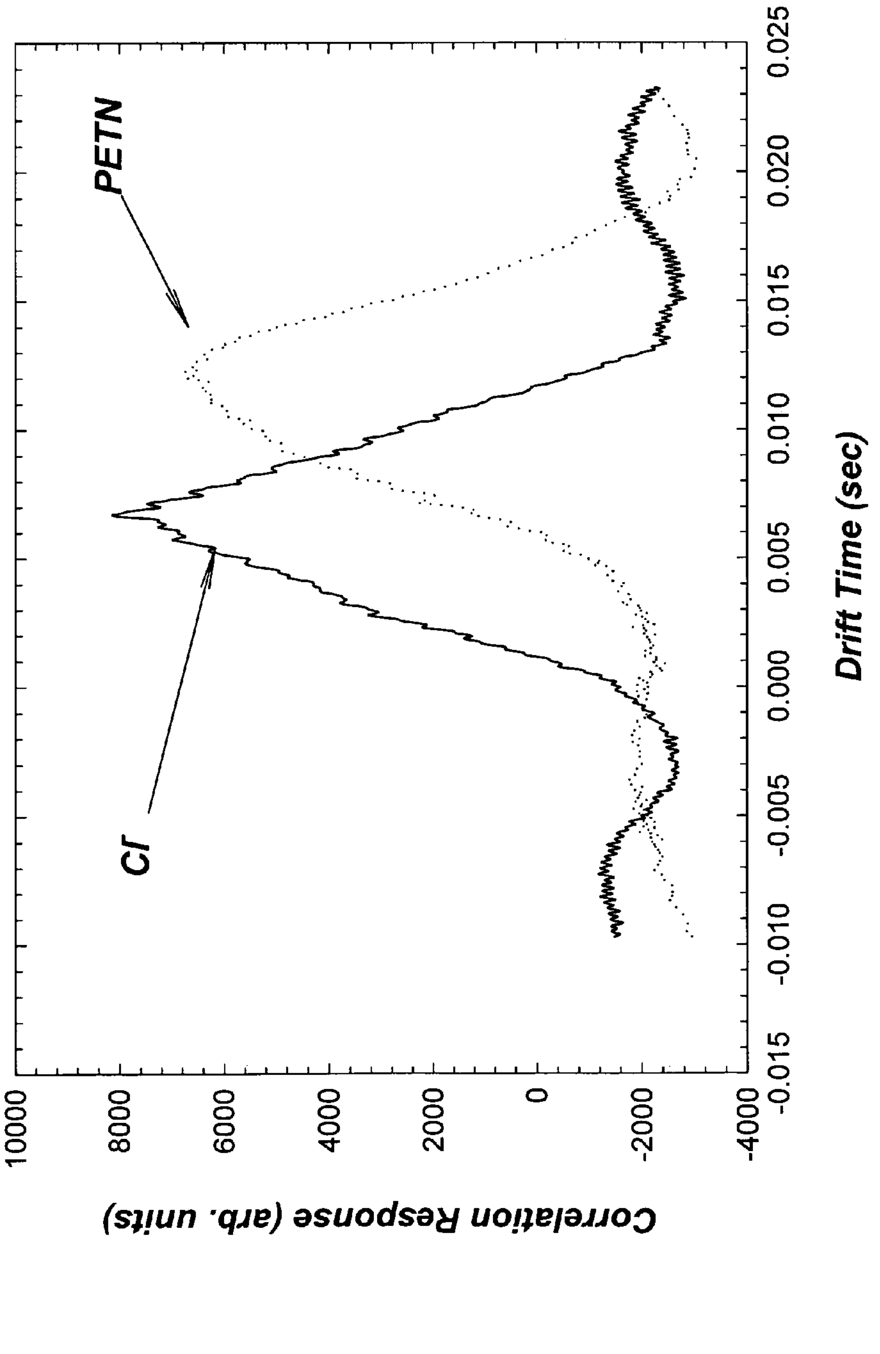
FIG. 6 shows plots of a correlation $Cl^-$ reactant ion peak and a correlation PETN product ion peak.

In FIG. 6 is shown an example of explosive sensing using CIMS. The $Cl^-$ reactant ion peak (solid line) was obtained used by correlating the Barker-generated reactant ion response against the Barker mode gating function, as described above. The $Cl^-$ had a reduced mobility of 2.97 $cm^2/(Vs)$ with an electric field intensity of 14.6 kV/m at 100° C. To demonstrate the utility of CIMS for explosives sensing, a 2 ng sample of pentaerythritol tetranitrate (PETN) explosive was desorbed from the sample screen of the preconcentrator and gated into the spectrometer using the 13-bit Barker code. A correlation was performed on the measured PETN product ion response signal ($i_{signal}(t)$), using the Barker-generated $Cl^-$ reactant ion response as the basis function ($i_{basis}(t)$), according to Eq. [11]. As observed in the plot, the PETN peak (dotted line) shifts to the right in time from the $Cl^-$ peak. In the PETN experiment, the PETN concentration was large enough to completely scavenge all of the available $Cl^-$ reactant ions in the reaction region of the spectrometerand reduce the reactant ion peak amplitude to zero. The measured reduced mobility of PETN was 1.43 $cm^2/(Vs)$. The measured PETN mobility compared well with published values. See Matz et al., *Talanta* 54, 171 (2001), and G. A. Eiceman and Z. Karpas, page 260.

The peak resolution (R) is traditionally defined as the drift time divided by the width of the ion response peak at half of its amplitude, $\Delta t_{1/2}$, or:

$$R \equiv \frac{t_{drift}}{\Delta t_{\frac{1}{2}}} \quad [12]$$

However, application of this definition to the correlated peaks of FIG. 6 leads to resolution values that are meaningless, due to their small size. This is because an artifact of the correlation function is a correlated peak that is twice as wide as the measured response peak. Since the measured response peak is broadened due to the coding time (e.g., the width of the Barker-coded gating function shown in FIG. 3 is about 13 bits×500 μsec=6.5 msec), the correlated peak widths are about 13 ms wide, compared to the unmodulated peak width of about 1 ms for the normal mode operation.

However, the improvement in SNR illustrates that the two peaks in FIG. 6 are very easily resolved, in spite of the peak width increase. Thus, a better definition of resolution for CIMS accounts for the improvement in SNR, and enables comparison to the normal mode operation. This definition of CIMS resolution, $R_{CIMS}$, includes a term that doubles the width of the peak and also accounts for the observed SNR improvement:

$$R_{CIMS} \equiv \frac{R}{2}\frac{SNR_{CIMS}}{SNR_1} \quad [13]$$

where $SNR_{CIMS}$ is the SNR of the correlation peak and $SNR_1$ is the SNR of a single normal mode peak. Using this definition, the CIMS resolution was about 80 for the miniature IMS drift tube used in the portable trace explosives detector. In the normal mode shown in FIG. 4, the resolution calculated using Eq. [12] was on the order of 8. Thus, the apparent resolution was enhanced by a factor of about 10 using CIMS.

Similar CIMS measurements were performed on cyclonite (RDX) and trinitrotoluene (TNT) using the trace explosives detector operating as a correlation IMS with a 13-bit Barker coding pattern. The results of these measurements are summarized in the Table 1, which shows the SNR enhancement (i.e., $SNR_{CIMS}/SNR_1$) and effective resolution enhancement (i.e., $R_{CIMS}/R$) for PETN, RDX, and TNT. The mobility numbers for the explosive ion peaks were calculated by using the known mobility of $Cl^-$ to calculate the drift time of the correlated $Cl^-$ peak. The explosive ion data was then scaled in time to obtain the change in drift time for the explosive ion peak. The reduced mobility for the explosive ions were then calculated from the known drift tube length (37 mm), known electric field (14.6 kV/m), ambient temperature (100° C.), and ambient pressure at Albuquerque, N. Mex. (630 Torr). The values in parenthesis are published literature value ranges for these materials. See G. A. Eiceman and Z. Karpas, Chapter 6. The mobility numbers indicate good agreement between the CIMS technique and normal IMS operation. The SNR enhancement factor was calculated by dividing the correlation SNR for the explosive ion peak by the normal-mode SNR of a single trace of $Cl^-$. The resolution enhancement factor is calculated from Eq. [13].

TABLE 1

Reduced mobility, SNR enhancement factor, and resolution enhancement for PETN, RDX, and TNT using CIMS.

| Explosive | Reduced Mobility ($cm^2/(Vs)$) | SNR Enhancement Factor | Resolution Enhancement Factor |
|---|---|---|---|
| PETN | 1.43 (1.26-1.48) | 16 | 8 |
| RDX | 1.46 (1.47-1.63) | 15 | 7.5 |
| TNT | 1.72 (1.49-1.67) | 11 | 5.5 |

The SNR enhancement observed in the experiment and tabulated in Table 1 is between a factor of 11 and 16 for the three explosive analytes. Consistent with the measured enhancement, the theoretical SNR enhancement calculated from Eq. [4] is a factor of 13. The 13-bit Barker code only fires the IMS gate 9 times during the interval of the code. However, since information is also encoded by leaving a time bin empty, signal energy is still increased in that bin. The noise power is uncorrelated to the operation of the IMS and should be a constant between the two operational modes except for the minor increase in switching noise from the multiple switching transients of the coded gating function. Thus, the SNR enhancement is theoretically calculated to be equal to the number of bits of the 13-bit Barker code, as observed.

The present invention has been described as correlation ion mobility spectroscopy. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A correlation ion mobility spectrometer, comprising:
- a reaction region for ionizing a sample vapor to form ions,
- a drift region in which the ions drift under the influence of an electric field against a counter-flowing drift gas,
- means for gating a current of the ions into the drift region,
- means for applying a gating function to the gating means, thereby modulating the ion current,
- a detector for detecting the ions at the end of the drift region to provide an ion response signal, and
- a matched filter for correlating the ion response signal with the ion current modulation to provide a correlation mobility spectrum.

2. The spectrometer of claim 1, wherein the gating function comprises a binary modulation.

3. The spectrometer of claim 2, wherein the binary modulation comprises a Barker code.

4. The spectrometer of claim 1, wherein the gating function comprises an analog modulation.

5. The spectrometer of claim 4, wherein the analog modulation comprises a chirped sinusoid.

6. The spectrometer of claim 1, wherein the gating means comprises an ion shutter.

7. The spectrometer of claim 6, wherein the ion shutter comprises a Bradbury-Neilson shutter.

8. The spectrometer of claim 6, wherein the ion shutter comprises a Tyndall shutter.

9. The spectrometer of claim 1, wherein the reaction region comprises means for pulsed photoionization of the sample vapor.

10. The spectrometer of claim 1, wherein the reaction region comprises means for pulsed corona discharge ionization of the sample vapor.

11. The spectrometer of claim 1, wherein the matched filter correlates the ion response signal with the gating function.

12. The spectrometer of claim 1, wherein the matched filter correlates the ion response signal with a basis function referenced to the gating function.

13. The spectrometer of claim 12, wherein the matched filter correlates the ion response signal, $i_{signal}(t)$ with a basis function, $i_{basis}(t)$, comprising a reactant ion response, to provide the correlation mobility spectrum, $C(t_{drift})$, according to:

$$C(t_{drift}) = \int_{-\infty}^{\infty} i_{basis}(\tau) i_{signal}(t + \tau - t_{drift})\, d\tau \approx \sum_{i=1}^{n} i_{basis}(t_0) i_{signal}(t_0 + t_i - t_{drift}).$$

14. A method of correlation ion mobility spectroscopy, comprising:
- providing an ion mobility spectrometer, the spectrometer comprising:
  - a reaction region for ionizing a sample vapor to form ions,
  - a drift region in which the ions drift under the influence of an electric field against a counter-flowing drift gas,
  - means for gating a current of the ions into the drift region, and
  - a detector for detecting the ions at the end of the drift region to provide an ion response signal;
- modulating the gating means with a gating function, thereby modulating the ion current; and
- match filtering the ion response signal with the ion current modulation to provide a correlation mobility spectrum.

15. The method of claim 14, wherein the step of modulating comprises modulating the gating means with a binary gating function modulation.

16. The method of claim 15, wherein the binary modulation comprises a Barker code.

17. The method of claim 14, wherein the step of modulating comprises modulating the gating means with an analog gating function modulation.

18. The method of claim 17, wherein the analog modulation comprises a chirped sinusoid.

* * * * *